United States Patent [19]
Salzer et al.

[11] Patent Number: 5,239,865
[45] Date of Patent: Aug. 31, 1993

[54] PROCESS FOR MONITORING THE COOLANT LEVEL IN A COOLING SYSTEM

[75] Inventors: Werner Salzer, Wendlingen; Herbert Wieszt, Böblingen, both of Fed. Rep. of Germany

[73] Assignee: Mercedes-Benz AG, Fed. Rep. of Germany

[21] Appl. No.: 906,471

[22] Filed: Jun. 30, 1992

[30] Foreign Application Priority Data

Jul. 23, 1991 [DE] Fed. Rep. of Germany ....... 4124363

[51] Int. Cl.⁵ .................... G01K 13/00; G01K 31/68
[52] U.S. Cl. ........................... 73/292; 62/129; 340/585; 340/622; 374/143
[58] Field of Search .............. 364/551.01; 374/145, 374/143; 62/129, 126, 127; 340/585, 449, 622; 141/95

[56] References Cited

U.S. PATENT DOCUMENTS

| | | | |
|---|---|---|---|
| 3,729,949 | 5/1973 | Talbot | 62/126 X |
| 4,510,576 | 4/1985 | MacArthur et al. | 364/551.01 |
| 4,652,854 | 3/1987 | Kelly | 340/449 |
| 4,672,920 | 6/1987 | Duprez | 340/449 |
| 4,848,096 | 7/1989 | Funahashi et al. | 62/129 X |
| 4,856,288 | 8/1989 | Weber | 62/129 |
| 5,044,168 | 9/1991 | Wycoff | 62/129 X |

FOREIGN PATENT DOCUMENTS

3706152 9/1988 Fed. Rep. of Germany.
2-195164 10/1990 Japan.

*Primary Examiner*—Daniel M. Yasich
*Attorney, Agent, or Firm*—Evenson, McKeown, Edwards & Lenahan

[57] ABSTRACT

A process for monitoring the coolant level in a cooling system, in particular in a motor vehicle in which the relative pressure and the temperature of the coolant are measured on the high-pressure side of the coolant circuit, using the measured pressure value. A temperature assigned to the pressure value is established on the basis of a coolant specific function (temperature=f (pressure)) and the undercooling of the coolant is then determined by subtracting the measured temperature from the assigned temperature, which undercooling is analyzed as a measure for the coolant level.

14 Claims, 2 Drawing Sheets

PROCESS FOR MONITORING THE COOLANT LEVEL IN A COOLING SYSTEM

BACKGROUND AND SUMMARY OF THE INVENTION

The invention relates to a process for monitoring the coolant level in a cooling system, in particular in a motor vehicle.

A process for regulating a motor vehicle air-conditioning system is known from German Patent Document 37 06 152, in which sensor signals from a plurality of sensors are fed to a control and monitoring device of a coolant circuit of the cooling system. The sensor signals are linked together for the calculation, as a function of or with regard to all fed input values, of output signals guaranteeing an optimal operating method for the components located in the coolant circuit. As sensors in the coolant circuit, there are provided, in this case, a sensor for recording the hot-gas temperature on the output side of the compressor, a sensor for recording the injection temperature or the pressure of the coolant on the input side of the evaporator and a sensor for recording the suction pressure or the suction temperature on the input side of the compressor.

However, optimum functioning of a cooling system is only ensured, that is irrespective of the particular control process, if the coolant is filled to the correct level. This is particularly also the case with regard to environmental aspects.

For monitoring the coolant level in a cooling system, a process according to the earlier described type is known from Japanese Patent Document JP-Abstract M-1037, Oct. 19, 1990, Vol. 14/No. 481=JP-A-2-195164, according to which the hot-gas temperature and the pressure on the output side of the compressor, the condenser output temperature and the temperature and the pressure on the input side of the compressor are measured and from the measured pressure values there are derived temperature values thereto assigned. These decimal temperature values are related, in turn, to the log p-t graph of the coolant. Thus, an overheating of the coolant can be determined by calculation and can be analyzed as a function of the coolant level.

An object of the invention is to provide a substantially simpler process for coolant level monitoring, in order thereby to further optimize the operating method of known cooling systems.

This and other objects are achieved by the present invention which provides a process for monitoring the coolant level in a cooling system of a motor vehicle. The relative pressure and the temperature of the coolant are measured on the high-pressure side of the coolant circuit and the measured coolant temperature and a temperature derived from the pressure is appropriately evaluated with respect to the coolant level. The coolant temperature is derived from the measured pressure value on the basis of a coolant-specific function. An undercooling U of the coolant is determined by subtracting the measured coolant temperature from the derived coolant temperature, the undercooling U providing a measure of the coolant level.

In a conventional process related to an optimal system-filling and the limit line of the log p-t graph, the level is monitored by evaluating an overheating of the coolant, i.e. in the area of high temperatures and of specific enthalpy. By contrast, the present invention is based upon the recognition that an established undercooling of the coolant also constitutes a measure for its level, thereby offering the advantages that the coolant-specific function temperature=f (pressure) is easily obtained by mirroring the appropriate part-area of the limit line of the log p-t graph and that only a small measuring effort is necessary, since on the high-pressure side only two measured values have to be taken.

Other objects, advantages and novel features of the present invention will become apparent from the following detailed description of the invention when considered in conjunction with the accompanying drawings.

DETAILED DESCRIPTION OF THE DRAWINGS

Figure 1:
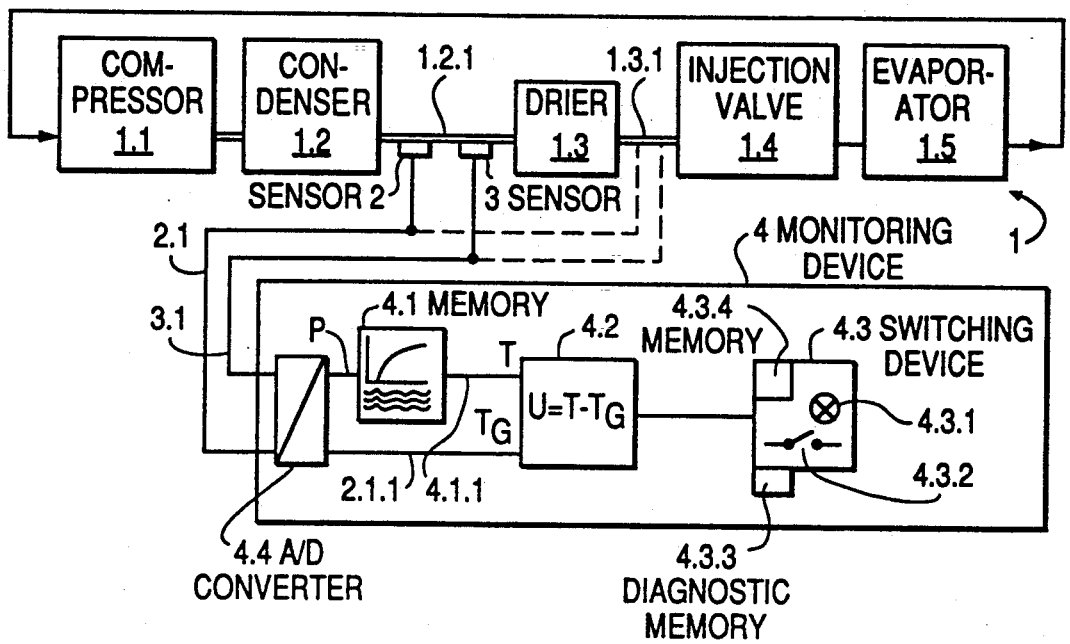
FIG. 1 shows a block diagram of the cooling system with a monitoring device.

According to the diagrammatic representation in FIG. 1, the coolant circuit of the cooling system is formed from a compressor 1.1, a condenser 1.2, a liquid reservoir with drier 1.3, an injection valve 1.4 and an evaporator 1.5. The high-pressure side of the coolant circuit exists between the compressor output and the injection valve input (as represented in the figure by a double line). On the coolant-high pressure-liquid conduit 1.2.1 between the condenser 1.2 and the drier 1.3 (or alternatively in the conduit 1.3.1 between the drier 1.3 and the injection valve 1.4), there is disposed, in the proximity of the drier input (or alternatively of the drier output or on the drier itself), a pressure sensor 3 and a temperature sensor 2. Both the relative pressure and the temperature of the coolant are measured by the pressure sensor 3 and the temperature sensor 2, which are connected via signal lines 2.1 and 3.1 to a monitoring device 4.

The monitoring device 4 has a memory 4.1, a subtracter 4.2 and a switching device 4.3. In the memory 4.1 there is stored, as a characteristic diagram, a characteristic curve or table of a coolant-specific function $T=f(p)$ of the cooling system in question, in which T denotes the temperature and p the relative pressure of the coolant. The measured pressure value p is fed to this memory 4.1 via the signal line 3.1 and, on the basis of the function, the temperature T assigned to this pressure value p is established and read out. The temperature T is fed via the signal line 4.1.1 to the subtracter 4.2, at whose other input, via the signal line 2.1.1, the measured temperature value $T_G$ is available.

In the subtracter 4.2, the undercooling U of the coolant is determined by subtracting the measured temperature $T_G$ from the assigned temperature T, $U=T-T_G$. The underoooling U, as a measure for the coolant level, is appropriately evaluated in the switching device 4.3 such that, where U is greater than a pre-specified value W1 [in Kelvin](e.g. $U>1K$), which value can vary as a function of the engine speed $n_M$ of the vehicle, the coolant level is assessed as being correct, that is to say the coolant circuit is correctly filled. On the other hand, where U is less than the pre-specified value W1, the coolant level is assessed as being too low, that is to say the coolant circuit is underfilled. Where, however, U exceeds a pre-specified value W2 (e.g. U>15 K), which value W2 can also vary as a function of the engine speed $n_M$, the coolant level is assessed as being too high, that is to say the coolant circuit is overfilled. This evaluation can result, for a slight underfilling, in a warning display 4.3.1 for the driver being activated by the switching device 4.3, or, in the case of major underfilling or overfilling, in a switch 4.3.2 being actuated to switch off the cooling/air-conditioning system. Irrespective of this, the assessment can also be stored as a fault signal in a diagnostic memory 4.3.3 of the switching device.

Figure 3:
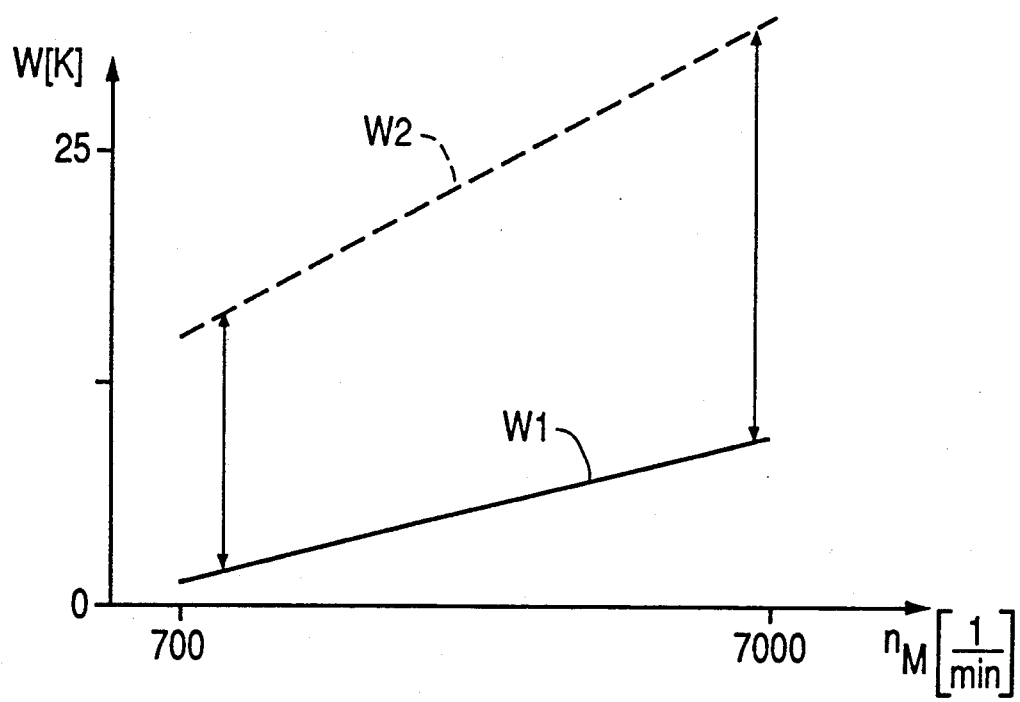
FIG. 3 shows a limit line graph for assessing the undercooling.

FIG. 3 shows how the values W1 and W2 stored in a memory 4.3.4 of the switching device 4.3 can vary as a function of the engine speed, $W=f(n_M)$. Such a variation is advantageous, since the undercooling calculation is made, of course, on a continuous time basis, that is to say not only at idling speed when the vehicle is stationary. The continuous line pre-specifies, in this case, the limit line for the values W1 and the dashed line the limit line for the values W2. Where U lies between these two limit lines, a correct filling is present. Where U exceeds the limit line W2, overfilling is present, where U falls below the limit line W1, underfilling is present.

Figure 2:
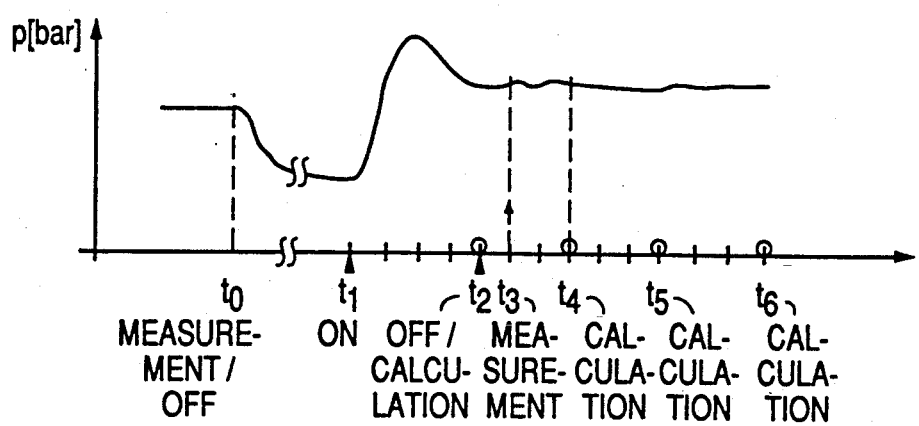
FIG. 2 shows a time-scale for the undercooling calculation.

If the compressor 1.1, at a time $t_1$, is now switched on at a control unit by the user of the cooling system (see FIG. 1 in conjunction with FIG. 2), then the pressure and temperature are continuously measured from the time $t_3$ (e.g. $t_1+5$ sec.), this time having to be empirically tailored to each individual cooling/air-conditioning system and being dependent, in principle, upon when the pressure fluctuations have abated as a result of the compressor having been switched on, that is to say the pressure signal having stabilized. If this is the case, then the first undercooling calculation, however, is made at a time $t_4$ (e.g. $t_1+7$ sec.) and further undercooling calculations at the times $t_5$ (e.g. $t_4+3$ sec.), $t_6$ (e.g. $t_5+3$ sec.) ... $t_n$ (e.g. $t_{n-1}+3$ sec.). These measurements and calculations are advantageously made in a variable grid until such time as a quasi stable state of the coolant undercooling $dU/dt \approx constant$ is produced. Further calculations are only then resumed once the compressor is switched on again or when there is a compressor coupling signal present.

The times $t_n$ at which the evaluation of the respectively calculated undercooling is made are variable and must in each case be tailored empirically to the system components of the respective coolant circuit.

In the event that, already prior to the time $t_4$, the compressor 1.1 is switched off again, time $t_2$, then the measured values at the time $t_0$, that is to say when the compressor was last switched off, form the basis of the undercooling calculation.

If, on the other hand, the cooling system is operated on the ECO-program or the compressor was not yet running after the vehicle ignition had been turned on, then no undercooling calculation is performed.

The recording of the measured values of the sensors can be effected according to the usual known measuring conditions of an A/D conversion, for which purpose the measured values are digitally filtered in an upstream A/D converter 4.4 of the monitoring device 4 - e.g. in the ratio 3 times the previous measured value plus the current measured value divided by 4 is equal to a valid measured value, this corresponding to a first-order time-delay element of which the damping is arithmetically matched to the system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for monitoring the amount of coolant in a cooling system of a motor vehicle, the relative pressure and the temperature $T_G$ of the coolant being measured on the high-pressure side of the coolant circuit, comprising:
   deriving the coolant temperature T from the measured pressure value on the basis of a stored coolant-specific function;
   determining undercooling U of the coolant by subtracting the measured coolant temperature $T_G$ from the derived coolant temperature T, the undercooling U providing values as a measure of the amount of coolant;
   comparing the undercooling U with at least one predetermined value; and
   at least one of activating an alarm signal and switching off the cooling system when the comparing of the undercooling U with the at least one pre-determined value indicates one of an overfilling and an underfilling of coolant in the cooling system.

2. Process according to claim 1, wherein an undercooling U having positive values less than a pre-determined value W1 indicates an underfilling of the coolant in the cooling system.

3. Process according to claim 1, wherein an undercooling U having positive values greater than a pre-determined value W2 indicates an overfilling of the coolant in the cooling system.

4. Process according to claim 3, further comprising activating an alarm signal when an overfilling of the coolant is indicated.

5. Process according to claim 3, further comprising switching off the cooling system when an overfilling of the cooling system is indicated.

6. Process according to claim 3, further comprising storing a fault signal in a diagnostic memory when an overfilling of the cooling system is indicated.

7. Process according to claim 2, further comprising activating an alarm signal when an underfilling of the coolant is indicated.

8. Process according to claim 2, further comprising switching off the cooling system when an underfilling of the cooling system is indicated.

9. Process according to claim 2, further comprising storing a fault signal in a diagnostic memory when an underfilling of the cooling system is indicated.

10. Process according to claim 3, wherein the pre-determined value W2 varies as a function of the engine speed of the motor vehicle $W=f(n_M)$ and is stored as a characteristic curve in a memory.

11. Process according to claim 2, wherein the pre-determined value W1 varies as a function of the engine speed of the motor vehicle $W=f(n_M)$ and is stored as a characteristic curve in a memory.

12. Process according to claim 1, wherein the measurements and analyses are made on a continuous time basis in a variable time grid up to a quasi stable state of the undercooling of the coolant $dU/dt \approx constant$.

13. Process according to claim 1, wherein the relative pressure and the temperature of the coolant are measured before the condenser.

14. Process according to claim 1, wherein the relative pressure and the temperature of the coolant are measured after the condenser.

* * * * *